United States Patent

Welck

[11] 3,987,766
[45] Oct. 26, 1976

[54] ENGINE ENCLOSURE AND HEAT DEFLECTOR ARRANGEMENT
[75] Inventor: Arnold Emil Welck, Horicon, Wis.
[73] Assignee: Deere & Company, Moline, Ill.
[22] Filed: Aug. 11, 1975
[21] Appl. No.: 603,446

[52] U.S. Cl............ 123/41.66; 123/41.49; 123/41.58; 123/41.62; 123/41.7
[51] Int. Cl.² ............ F01P 7/04
[58] Field of Search........... 123/41.58, 41.59, 41.65, 123/41.66, 41.7, 41.62, 41.72, 41.75, 41.79, 41.68, 41.8, 41.49, 41.67

[56] References Cited
UNITED STATES PATENTS
3,859,965 1/1975 Hatz.................. 123/41.66
3,926,155 12/1975 Hatz.................. 123/41.62
3,937,192 2/1976 Longhouse.......... 123/41.66

*Primary Examiner*—Charles J. Myhre
*Assistant Examiner*—Daniel J. O'Connor

[57] ABSTRACT

A lawn and garden tractor includes an air cooled engine which is enclosed by structure including a hood and opposite side panels. The engine is of a type including a heat shroud for directing cooling air about cooling fins of the engine head, the shroud having a top wall provided with an air intake opening located above a blower or fan of the engine. The hood and opposite side panels cooperate to define air inlet openings at opposite sides of the enclosure, the openings being located at a level above the top wall of the shroud. A deflector or baffle member is provided for preventing hot air exiting from the shroud from recirculating through the intake opening of the shroud.

7 Claims, 3 Drawing Figures

ENGINE ENCLOSURE AND HEAT DEFLECTOR ARRANGEMENT

BACKGROUND OF THE INVENTION

The present invention relates to vehicles having enclosed air cooled engines and more particularly relates means for aiding in the cooling of an enclosed engine.

In order to comply with governmental noise regulations, it has become necessary for designers of recreational and lawn and garden equipment to construct them such that their engines and mufflers are placed in noise dampening enclosures. Since the engine of a vehicle generates heat and transfers it on to the muffler, the enclosing of these components makes it necessary that steps be taken to insure that overheating of the tractor engine does not take place.

SUMMARY OF THE INVENTION

According to the present invention, there is provided an enclosed vehicle engine and more particularly there is provided means for insuring adequate cooling of an enclosed engine.

An object of the invention is to provide a heat deflecting panel structure which cooperates with a hood and opposite side panels enclosing an engine such that heated air is prevented from recirculating through the air intake of the engine.

A more specific object is to provide an engine enclosed as described in the aforementioned paragraph, wherein the intake of the engine is directed upwardly and is located at a level below longitudinal air intake passages defined by cooperating parts of the side panels and the hood at opposite sides of the vehicle.

These and other objects will become apparent from reading an ensuing description in conjunction with the appended drawings.

DESCRIPTION OF THE PREFERRED EMBODIMENT

Figure 1:
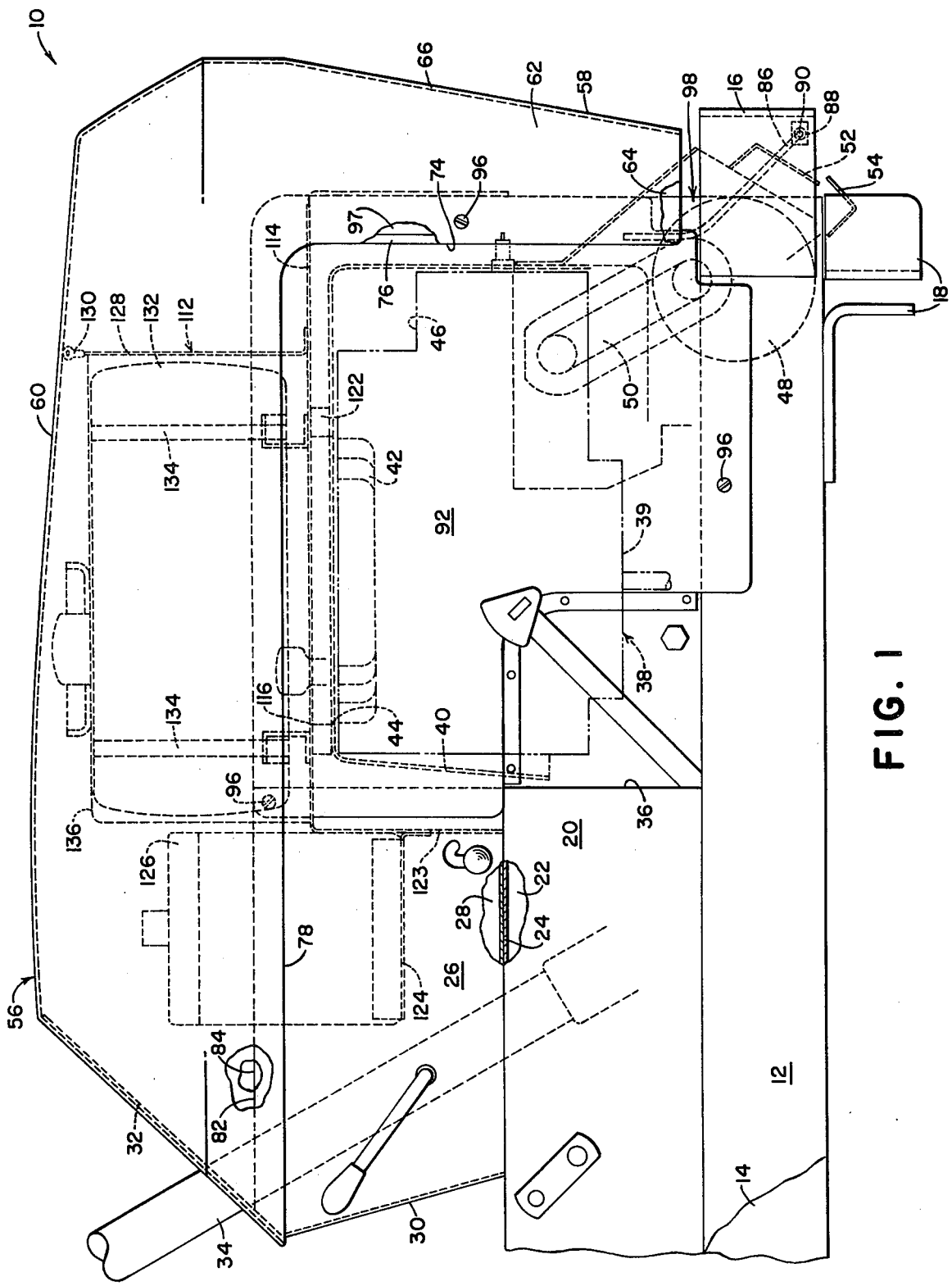
FIG. 1 is a right side elevational view of a portion of a lawn and garden tractor showing an engine enclosure thereof constructed according to the principles of the present invention.

Referring now to FIG. 1, therein is shown a portion of a lawn and garden tractor indicated in its entirety by the reference numeral 10. The tractor 10 includes a main frame comprising right and left transversely spaced, longitudinally extending frame members 12 and 14, respectively, having their forward ends joined by a transverse bumper structure 16. Fixed to the forward underside portions of the members 12 and 14 is bracketry 18 adapted for having a front axle of the tractor (not shown) connected thereto.

Supported on the frame members 12 and 14 at a location intermediate front and rear ends thereof is a member which is inverted U-shaped in vertical cross section and includes right and left side walls 20 and 24, respectively connected to and extending upwardly from the frame members 12 and 14, the wall 20 and 22 being interconnected by a top wall 24. Extending upwardly from the side walls 20 and 22 are respective side walls 26 and 28 of a console structure including an upwardly and rearwardly inclined rear wall 30 which supports an upwardly and forwardly inclined instrument panel 32. Besides having a plurality of instruments (not shown) mounted thereon or extending therethrough, the instrument panel 32 has a steering column 34 projecting therethrough. Only a portion of the column 34 is shown for the sake of simplicity. The forward ends of the side walls 20 and 22 and of the side walls 26 and 28 terminate at a common transverse vertical plane indicated at 36.

An engine 38 is mounted on the tractor frame members 12 and 14 through conventional means (not shown) and includes a body 39, shown here in broken outline, enveloped by an integral shroud 40 so disposed relative to a fan or blower 42 of the engine and air is drawn through an opening 44 of the shroud 40 and draws between the body 39 and the shroud 40 so as to pass over a forward cylinder head area 46 of the engine so as to cool the engine as is conventional, the air being exhausted downwardly at a forward location so as to pass around an exhaust muffler 48 extending transversely between forward end portions of the frame members 12 and 14 and connected to the engine through conduit means 50. A first transverse angle baffle plate 52, shown only in end view in FIG. 1, is located forwardly of the muffler 48 and extends transversely coextensive therewith so as to intercept heated air and deflect the latter downwardly towards the upper surface of a V-shaped baffle plate 54 also extending transversely coextensive with the muffler 48 so as to intercept the heated exhaust gases so as to prevent the latter from passing downwardly and scorching the grass below the tractor in the event that the tractor is left setting any length of time with the engine running.

Figure 3:
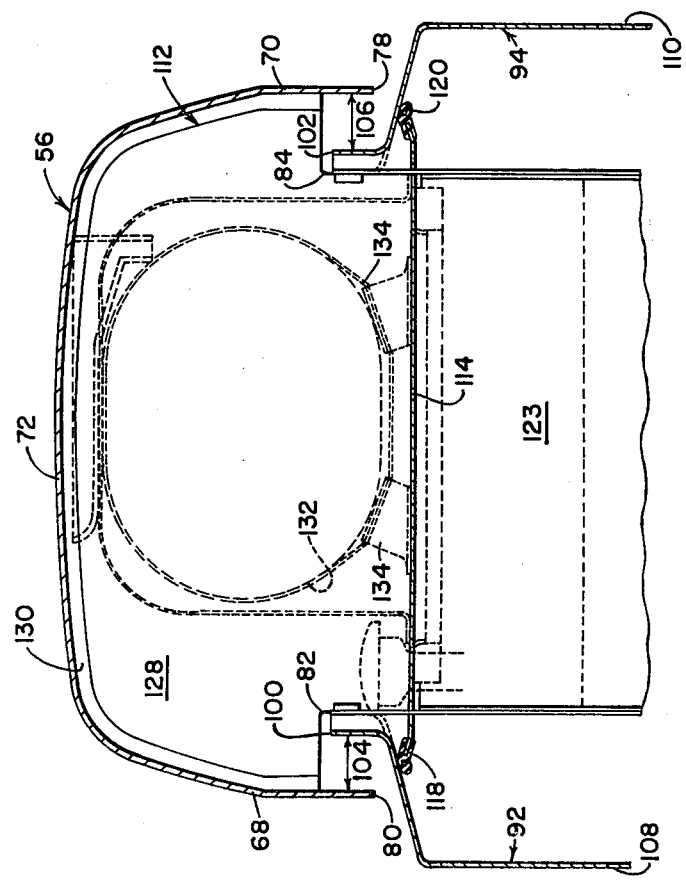
FIG. 3 is a vertical sectional view taken along the lines 3—3 of FIG. 2.

For the purpose of housing the engine 38 so as to prevent noise generated thereby from radiating through the air away from the engine, the engine 38 is substantially completely enclosed by a housing. Specifically, the housing includes a hood 56 comprising an upright front portion 58 which blends into a longitudinal portion 60. The front portion 58 includes transversely spaced right and left side walls 62 and 64 joined by a front wall 66 and the longitudinal portion 60 of the hood includes right and left side walls 68 and 70 joined by a top wall 72. The right and left walls 62 and 64 of the front portion 58 of the hood respectively have vertical rear edges 74 and 76 (FIG. 1) while the side walls 68 and 70 (FIG. 3) of the longitudinal portion 60 of the hood respectively have lower horizontal edges 78 and 80, the latter edges being outwardly of and below the level of horizontal top edges 82 and 84 (FIG. 3) respectively, of the opposite side walls 26 and 28 of the console structure. So that the hood 56 may be swung up so as to expose the engine 38 and other components under the hood, a pair of rods 86 (only the right one being shown) are respectively connected to the lower end portions of the right and left walls 62 and 64 of the front of the hood 56 and extend downwardly to a pair of transversely spaced tabs 88 fixed to the bumper 16 and are pivotally connected as at 90 to the tabs 88 so as to define a horizontal pivot axis.

Figure 2:
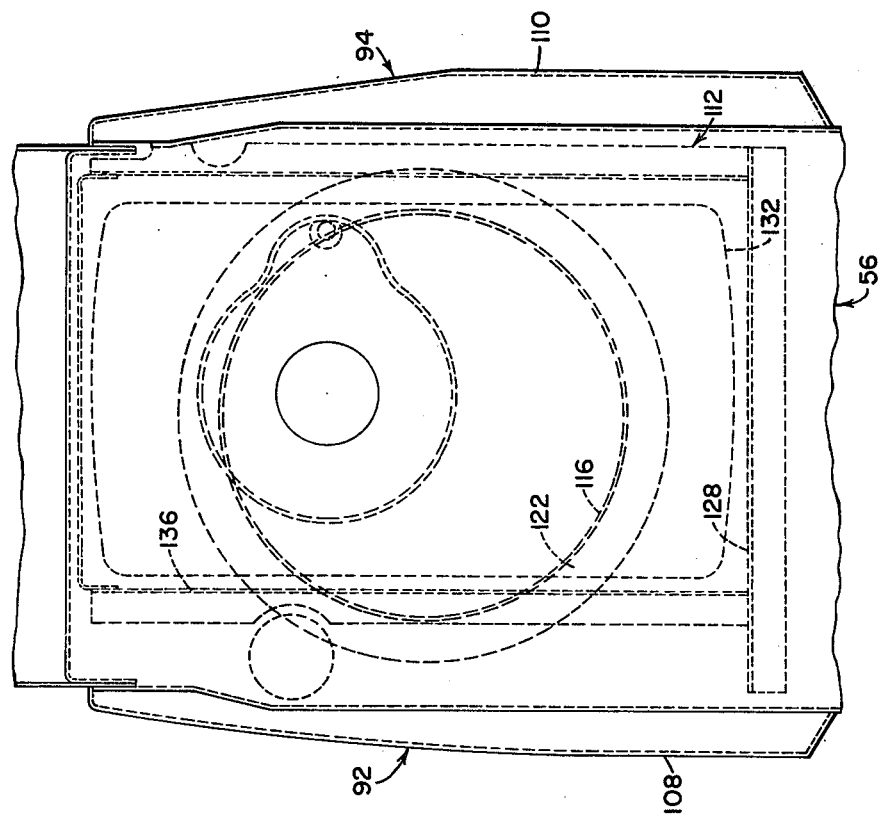
FIG. 2 is a top elevational view showing a part of the hood, side panels and heat deflector member of the tractor disclosed in FIG. 1.

In addition to the hood 56, the engine housing or enclosure includes right and left side panels 92 and 94, respectively. Each of the side panels 92 and 94 is held in place by three screws 96 (only the screws for the right side panel being shown). Specifically, the right side panel 92 is held in place by a first screw 96 extending through an upper rear corner of the panel 92 and an upper corner of the console side walls 26, by a second one of the screws 96 extending through a lower central portion of the panel 92 and the frame member 12 and by a third one of the screws 96 extending through a front central portion of the panel 92 and one leg 97 of an inverted U-shaped member 98 having the lower ends of opposite legs respectively fixed to the frame members 12 and 14. The left side panel 94 is mounted at the other side of the tractor in a similar manner. As can best be seen in FIGS. 2 and 3, the right and left side panels 92 and 94 have respective upper horizontal edges 100 and 102 respectively located inwardly of and above the level of the edges 78 and 80 of the hood 56, the hood and side panels thus cooperating to define longitudinal gaps 104 and 106 at the right and left sides of the tractor for permitting air to be drawn into the intake opening 44 of the engine 38 through means of the fan 42. Also, as can best be seen in FIGS. 2 and 3, the side panels 92 and 94 are respectively bulged outwardly as at 108 and 110 for the purpose of accommodating portions not shown of the engine 38.

Provided for preventing recirculation of heated air through the engine 38 and forming an important feature of the present invention, is a heat deflector or baffle member indicated in its entirety by the reference numeral 112. The member 112 is of a sheet metal construction and includes a horizontal portion 114 which is generally rectangular in plan view and extends between the side panels 92 and 94 at a level which is slightly above the top of the engine shroud 40, the portion 114 being provided with an opening 116 which is in register with the opening 44 in the shroud 40. Right and left seal members 118 and 120, respectively, form the opposite side edges of the horizontal portion 114 of the baffle member 112 and are sealingly engaged with the side panels 92 and 94 and a circular seal member 122 surrounds the opening 44 and is sealingly mounted between the shroud 40 and the portion 114. The horizontal portion 114 thus prevents air from travelling upwardly alongside the engine 38 to the air inlet opening 116.

The rearward edge of the horizontal 114 blends into a vertical portion 123 of the deflector member 112, the vertical portion 123 extending downwardly to the top wall 24 to which it is connected by conventional means not shown. The forward end of the horizontal portion 114 is connected to the top of the inverted U-shaped support member 98. It is here noted that a horizontal support platform 124 extends rearwardly from the vertical leg 122 and provides a support for a battery 126.

For the purpose of preventing heated air from circulating through the air inlet opening 116 from an area forwardly of an engine 38, the deflector member 112 includes a second vertical portion 128 which is located forwardly of the opening 116 and extends into engagement with the hood 56, the marginal edge of the portion 128 being formed by a resilient seal 130 which is sealingly engaged with the hood 56.

A fuel tank 132 is supported on the top of the horizontal portion 114 of the deflector member 112 through means of connections 134, fuel tank means elevated above the opening 116 in the baffle member 112 so as to permit air to flow into the air intake of the engine 38. An air intake screen 136 is mounted on the portion 114 of the member 112 and extends over the top of and behind the fuel tank 132 and has a forward end engaged with the vertical portion 128 of the deflector member 112.

The operation of the invention is as follows. With the tractor running, the rotation of the fan or blower 42 of the engine 38 will cause cool air to be drawn into the engine enclosure via the longitudinal gaps 104 and 106 at the opposite sides of the vehicle. The incoming air will then pass through the screen 136 on the way to the openings 116 and 44, the screen 136 thus preventing any relatively large pieces of foreign material which may be entrained in the air from passing into the engine 38. The blower 42 in conjunction with the engine shroud 40 acts to cause the cool air to be drawn over the cylinder block 46 and exhausted down towards the lower front portion of the engine in the vicinity of the muffler 48. This heated air is prevented from recirculating through the engine 38 via a path between the shroud 42 and the deflector member 112 by means of the circular seal or gasket 122, via a path between the engine 38 and the forward part of the hood 56 by the portion 128 of the deflector member 112 and via paths between the engine 38 and side panels 92 and 94 by the horizontal portion 114 of the member 112.

Thus, it will be appreciated that even though the engine 38 is enclosed in such a way that sounds radiating horizontally from the engine will be deflected by the housing so as to dampen the sounds, the engine will remain sufficiently cool due to the fact that the recirculation of heated air through the engine is prevented by the cooperation of the deflector member 112 with the side panels 92 and 94 and the hood 56.

I claim:

1. In a combination of an air cooled engine having a heat shroud forming an integral part thereof and including a top wall provided with an intake opening and an open bottom, whereby air will flow from top to bottom through the shroud and an engine enclosure defined by a hood extending over the engine and opposite side panels disposed on opposite sides of the engine, the improvement comprising: the hood and side panels including respective lower and upper portions cooperating to define air inlet opening means at the opposite sides of the engine at a level above the top wall of the heat shroud; and a heat deflector means extending between the shroud and the enclosure in such relationship to the intake opening that flow to the latter from respective areas between the engine and the side walls and a front portion of the hood is prevented.

2. The combination defined in claim 1 wherein said heat deflector means comprises a sheet metal member including a generally horizontal portion extending from one side panel to the other at a level above the top wall of the shroud and provided with an opening located directly above the intake opening; a seal surrounding the intake opening and disposed in sealing relationship between the top wall of the shroud and the horizontal portion; and a generally upright portion extending upwardly from the horizontal portion at a location forwardly of the intake opening and having a peripheral portion engaged with the hood.

3. The combination defined in claim 2 wherein a fuel tank is mounted on the horizontal portion in a position spaced above the intake opening; and an intake screen being disposed about the fuel tank and mounted relative to the intake opening such that air will pass through the screen on the way to the opening.

4. The vehicle defined in claim 1 and further including a fuel tank mounted in the enclosure above the horizontal portion of the sheet metal member and the engine air intake and an air intake screen means mounted over the fuel tank and having edge portions secured to the horizontal portion at opposite sides of the tank.

5. In a vehicle including an engine enclosure defined by a hood and opposite side panels and having an air cooled engine located therein and the engine including a housing disposed thereabout and having a top wall provided with a cooling air intake opening, the improvement comprising: the hood having opposite sidewalls which include lower edge portions located at a level above the top wall of the housing; the opposite side panels having upper edge portions which are spaced inwardly and upwardly from said lower edge portions so as to define air intake opening means at the opposite sides of the enclosure; said engine being spaced from the hood and opposite side panels; a sheet metal member including a generally horizontal portion extending above the engine from one side panel to the other of the enclosure and including an opening located directly above the intake opening; said sheet metal member further including an upright portion located forwardly of the opening in the horizontal portion and engaging the hood so as to block the passage of air to the last named opening from the front part of the hood.

6. In a lawn and garden tractor of a type including an air cooled engine mounted on a chassis within an engine enclosure defined by a hood and opposite side panels and the engine including a shroud having a top wall provided with an air intake opening and having an open bottom, the improvement comprising: said hood having opposite side portions respectively cooperating with the opposite side panels to define air inlet means at the opposite sides of the tractor at a location at a level above that of the top wall of the shroud; a heat deflector including a generally horizontal plate portion extending above the engine at a level below the air inlet means and an upright plate portion extending upwardly from the horizontal plate portion at a location forwardly of the intake opening; said horizontal plate portion being provided with an opening located directly above the air intake and having opposite side portions respectively embracingly engaged with the opposite side panels; seal means surrounding the intake opening and sealingly engaging the shroud and horizontal plate portions and said upright plate portion having a peripheral edge portion embracingly engaged with an underside portion of the hood whereby heated air discharged from the open bottom of the shroud will be prevented from recirculating through the intake opening.

7. In a vehicle having a chassis supporting an air cooled engine having an upwardly directed air intake, and an engine housing including a hood extending over the engine and having depending side walls located at opposite sides of the engine and a pair of upright side panels located at opposite sides of the engine generally below the side walls of the hood, the improvement comprising: a sheet metal member having a generally horizontal portion extending between the side panels and above the engine and provided with an opening located directly above the air intake; first seal means surrounding the air intake and sealingly disposed between the engine and the horizontal portion and second seal means sealingly disposed between the side panels and the horizontal portion; and said side panels including upper edge portions spaced from and overlapping lower edge portions of said side walls of the hood so as to define air intake passage means to the housing; and said sheet metal member including an upright portion extending between the hood and the horizontal portion; and a third seal means sealingly disposed between the hood and the upright portion.

* * * * *